J. C. CAWSEY.
AUTOMATIC MILK MEASURING APPLIANCE.
APPLICATION FILED JUNE 1, 1920.

1,351,284.

Patented Aug. 31, 1920.

Inventor-
John Crocker Cawsey
By B. Singer,
Atty.

UNITED STATES PATENT OFFICE.

JOHN CROCKER CAWSEY, OF HAWERA, NEW ZEALAND.

AUTOMATIC MILK-MEASURING APPLIANCE.

1,351,284.  Specification of Letters Patent.  Patented Aug. 31, 1920.

Application filed June 1, 1920. Serial No. 385,735.

*To all whom it may concern:*

Be it known that I, JOHN CROCKER CAWSEY, subject of the King of Great Britain, residing at Hawera, in the Dominion of New Zealand, have invented a new and useful Improved Automatic Milk-Measuring Appliance; and I do hereby declare the following to be a full, clear, and exact description of the same.

This invention has been devised in order to provide improved means for use in automatically measuring milk.

The means devised have been designed specially for use in conjunction with milking machine installations of the class in which releasers are employed or in which the bucket system is employed, the object being to automatically measure the milk from each cow, and to separate a testing sample therefrom, as it passes to the releaser system or bucket, as the case may be. The means devised may however, be used for ordinary milk measuring purposes, as for instance in measuring the whole of the milk supply from a dairy farm, or the skim milk returned to the farmers from a dairy factory.

The invention will be fully explained with reference to the accompanying drawings, in which:—

Figure 1:
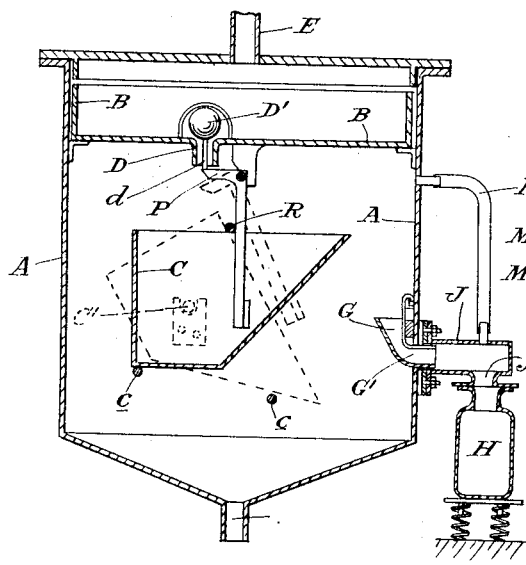

Figure 1 is a sectional front elevation, and

Figure 2:
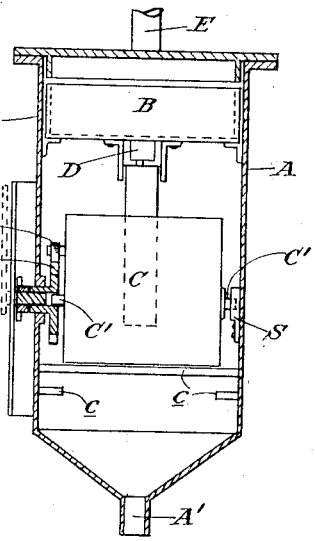

Fig. 2 a sectional side elevation of the appliance.

Figure 3:
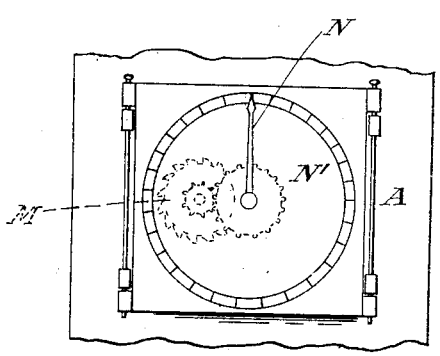
Figure 4:
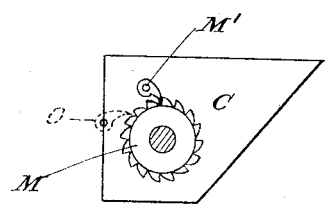

Figs. 3 and 4 are views of details of the recording means used with the appliance.

The appliance is formed by an inclosed vessel A, preferably of elliptical shape in sectional plan and of approved capacity. A receiving tray B is fitted inside the top of such vessel, and, below the tray a tipping measuring vessel C is mounted. The said tray B is formed of any desired depth and is provided with a discharge outlet D positioned above the measuring vessel C and controlled by a gravity valve D' that is kept open while the measuring vessel is in the position to receive the milk from the tray, and then automatically closes as it tips over.

The measuring vessel C is formed generally of inverted triangular shape and is so mounted upon its trunnions C' and weighted that normally it will retain a position shown by full lines in the drawings such as to receive milk delivered through the outlet D of the tray, but when a certain weight has been delivered into it, it will tip over into the positions shown by dotted lines, and discharge such milk into the bottom of the containing vessel A. Consequently, milk delivered into the tray B at the commencement of operations will run through its outlet into the measuring vessel until such vessel is full, when it will tip and at the same time close the outlet valve D' from the tray in order that the flow therefrom will be stopped, the milk then collecting in the tray, until the measuring vessel tips back again when it will re-open the valve, and the whole operations will be repeated, and so on continuously, so long as milk is delivered into the tray. Suitably positioned stops *c* are arranged to engage the vessel as it tips to and fro and thereby limit its movements in the respective directions.

When the appliance is to be used in conjunction with a milking machine by interposing it in the milk flow line from any cow, the containing vessel is made air-tight and the milk pipe from the teat cups is connected with the inlet E leading on to the tray. The bottom of the main vessel A is provided with an outlet A' to which a pipe leading to the releaser main or bucket (as the case may be) is connected. Thus the milk will be drawn by the vacuum of the system, through the appliance and then carried on away therefrom to the releaser or bucket, tipping the measuring vessel a number of times corresponding with the amount of milk passing through as it passes through the appliance.

The means for ascertaining the quantity of milk thus passing may consist of counter apparatus of well known design connected with the trunnions C' of the measuring vessel C so as to count and record the number of tips. Or the said vessels may be combined with means that are provided to allow of a quantity of milk being separated from the main quantity for testing purposes. These latter means are constituted by a small cup G arranged on the inside of the main vessel so as to catch a quantity of the milk thrown out of the measuring vessel C on each discharge thereof and having a discharge pipe G' leading to the outside of the vessel and a glass measuring flask H situated on the outside of such vessel the mouth of which engages over a discharge opening *j* of a chamber J into which the discharge pipe G' enters. This chamber J is also connected with the main vessel near its top through a rubber pipe connection K in order that the air conditions in such vessel may be established in the flask and thus the milk run from the cup into such flask. The flask when it is used also for measuring, is graduated in correspondence with the capacity of the small cup G and such capacity is arranged to have a direct proportion to the full quantity of milk discharged from the measuring vessel on each tip. Thus the amount of milk collected in the measuring flask will bear a direct proportion to the full quantity passing through the machine and the amount of the full quantity be readily calculated.

When counter apparatus is employed, a ratchet wheel M is arranged to gear with and actuate a hand N that rotates over a numbered dial N' fastened to the outside of the vessel A. A pawl M' is pivoted on the vessel C so that it engages the teeth of the ratchet wheel, and as the vessel tips down, moves the wheel through a portion of its rotation in order to actuate the counter hand N correspondingly. The said ratchet wheel is prevented from any reverse movement by the detent pawl O pivoted to the vessel A. This gearing is shown in the detail views Figs. 3 and 4 but any other approved gearing having a like effect may be employed.

The means for controlling the outlet valve D' from the tray B in correspondence with the movements of the measuring vessel may be of any suitable design. Suitable means for this purpose are shown in the drawings and they consist in forming the valve of ball or other gravity type, and in pivoting a bell crank lever P, on the underside of the tray B, one arm of which extends horizontally and engages beneath a pin $d$ projecting down from the ball through the outlet, and holding the valve open, while the other arm hangs vertically and is weighted so as to keep the bell crank normally in that position. The pendant arm is however arranged in the line of movement of a cross bar R on the tipping vessel C so that as such vessel tips, it will be engaged and swung across (thus lowering the horizontal arm and allowing the valve to close) and held there while the vessel remains tipped. Then when the vessel rises, the arm is freed so that it swings back to normal and raises the valve again. These movements are clearly shown by the dotted lines in Fig. 1. Or the valve stem may be engaged directly by a cross bar on the measuring vessel and lifted thereby as such vessel tips back.

The different parts of the appliance are made and mounted so that they may be taken apart for cleansing purposes. For instance, the measuring vessel is supported by its trunnions C' being journaled at one side, in a rest bearing S on the inside of the vessel A, and upon the other side, by being fitted into the inner end of the boss of the ratchet wheel M. It may therefore be lifted clear at any time.

The test intercepting cup G is also removably fitted in position so that it may be withdrawn inward, and the chamber J is secured to the vessel A by bolts or clips so that it may be disconnected whenever desired, and a sealing plate secured in its place, to cover the outlet into such chamber. Thus when it is required only to measure the milk passing through the appliance, the test separating and collecting means may be removed.

In like manner the indicating dial and its parts are removably attached to the outside of the vessel and the connection between its gearing and the ratchet wheel made in such a manner as to permit of the ratchet wheel being removed. Consequently all facilities are provided for the effectual cleaning of the different parts of the appliance.

I claim:

1. In combination with an automatic milk measuring apparatus including a chamber and a measuring tipping vessel therein, means for separating a small proportion of the milk from the main quantity and separately delivering it, consisting in a cup arranged to catch a quantity of milk as the measuring vessel tips to discharge its contents, a discharge leading from such cup, a receiving flask into which such discharge leads and a pipe connection between the said flask and the chamber, substantially as specified.

2. Automatic milk measuring apparatus comprising a chamber, a receiving tray in the upper portion of said chamber, a milk inlet leading to such tray, an outlet leading from the tray, a gravity valve controlling such outlet, a tipping measuring vessel arranged below the tray outlet and means for operating the tray valve and consisting in a bell crank lever pivoted beneath the tray and having a normally horizontally extending arm passing beneath the valve and holding it open and a vertically pendant weighted arm arranged in the path of movement of the measuring vessel as it tips downward, substantially as specified.

In testimony whereof I have signed this specification in the presence of two subscribing witnesses.

JOHN CROCKER CAWSEY.

Witnesses:
 THOMAS DERMOT WALSH,
 ARCHIBALD BLAIR.